United States Patent [19]
Anderson

[11] Patent Number: 5,819,794
[45] Date of Patent: Oct. 13, 1998

[54] HYDRAULIC TENSIONER WITH A CONTOURED DISC CHECK VALVE

[75] Inventor: David P. Anderson, Ithaca, N.Y.

[73] Assignee: Borg-Warner Automotive, Inc., Sterling Heights, Mich.

[21] Appl. No.: 724,844

[22] Filed: Oct. 3, 1996

[51] Int. Cl.⁶ ................................................. F16K 15/00
[52] U.S. Cl. ..................................... 137/543.17; 137/540
[58] Field of Search ..................................... 137/528, 535, 137/540, 543.17, 539; 474/110

[56] References Cited

U.S. PATENT DOCUMENTS

| | | | |
|---|---|---|---|
| 568,362 | 9/1896 | MacSpadden | 137/535 |
| 4,543,987 | 10/1985 | Ekeleme | 137/540 |
| 4,940,447 | 7/1990 | Kawashima et al. | |
| 5,314,388 | 5/1994 | Susuki | 474/110 |
| 5,346,436 | 9/1994 | Hunter et al. | |
| 5,700,213 | 12/1997 | Simpson | 474/110 |

FOREIGN PATENT DOCUMENTS 829560  3/1960  United Kingdom .............. 137/543.17

*Primary Examiner*—Denise L. Ferensic
*Assistant Examiner*—Ramyar Farid
*Attorney, Agent, or Firm*—Sidley & Austin; Greg Dziegielewski

[57] ABSTRACT

A hydraulic tensioner includes a disc check valve having a contoured surface that contacts a valve seat. The disc check valve provides a high frequency response. Additionally, the line contact between the disc and valve seat creates high contact pressure upon closing.

8 Claims, 1 Drawing Sheet

HYDRAULIC TENSIONER WITH A CONTOURED DISC CHECK VALVE

BACKGROUND OF THE INVENTION

This invention relates to a hydraulic tensioner having a check valve with a contoured disc. The check valve addresses two problems known as cavitation and stiction in the tensioner art.

Hydraulic tensioners are typically used as a control device for a chain drive system in an automobile timing system. The tension in the chain can vary greatly due to the wide variation in the temperature and the linear thermal expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system.

A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction. An example of a hydraulic tensioner is found in U.S. Pat. No. 5,346,436, which is incorporated herein by reference.

The check valve is optimally designed to permit fast, instantaneous flow into the chamber and limited or no flow in the reverse direction. The response of the valve to changes in flow is constrained by the mass of the ball or disc, the size of the flow orifice, and the preload and spring rate of the check valve spring. During start-up, the piston spring forces the piston outward to create a vacuum condition in the chamber, which causes the check valve to open and permit flow into the chamber. Until the oil temperature rises to the high temperature level of normal operating conditions, the viscosity of the oil is high and flow through the check valve is slow. In such a condition, the oil cannot enter the chamber fast enough to match the expansion of the chamber from the rising piston. Thus, the chamber does not contain enough oil to properly damp the chain. This condition of low pressure in the chamber without sufficient fluid is known as cavitation and can be damaging to the tensioner and chain.

In Kawashima et al., U.S. Pat. No. 4,940,447, the problem of cavitation is addressed by using a retainer mounted under the piston with a flat check plate. The plate is movable between two positions to open and close the channel or flow conduit into the chamber. The channel in the piston can be opened wide with a minimum stroke of the check plate to allow a large amount of oil to flow through the channel into the pressure chamber. Thus, cavitation is minimized by the quick response of the flat check plate valve.

Although U.S. Pat. No. 4,940,447 attempts to address the problem of cavitation, the flat check plate encounters another problem referred to as stiction. With an oil film between two flat surfaces, namely a flat check plate, or flat disc, and a flat retainer, or flat check valve seat, the adhesion of the two pieces can adversely affect check valve performance. Normally, the oil entering into the chamber through the check valve will push the disc to an open position. However, during conditions of low pressure differentials across the check valve, occurring particularly during start-up, the flat disc may be unresponsive due to the stiction effect. When the flat disc is adhered to the flat valve seat, the liquid is prevented from making a fast entry into the chamber.

In the present invention, a check valve assembly with a contoured disc is used to address the problem of cavitation associated with a ball check valve and the problem of stiction associated with standard flat disc type check valves. The contour provides a line type contact with the check valve seat, rather than a full surface type contact that would normally occur with a flat disc. The line contact and associated curvature allow for a less restrictive oil flow path between the disk and the seat. Typically, a flat disk and seat arrangement have a long tedious flow path that is highly restrictive and creates a stiction effect. The line contact between the disc and the seat creates high contact pressure upon closing, so the seat area is kept free of debris and sludge. Therefore, stiction is minimized.

In addition, the performance of a check valve is constrained by mass of the valve's moving components, the size of the flow orifice as the valve opens, and the spring preload and rate. The inlet orifice size of the valve of the present invention is large enough to allow a high flowrate of low temperature oil into the chamber so as to minimize the possibility of cavitation in the chamber.

SUMMARY OF THE INVENTION

The present invention is directed to a hydraulic tensioner with a high frequency check valve, which is characterized as having high flow and high response conditions. The tensioner includes housing with a central bore, which forms a fluid chamber. A hollow plunger is slidably received within the bore and creates a fluid chamber with the bore. The plunger, or piston, is biased in a protruding direction from the housing by a spring. A passage is provided in the housing to connect the chamber with a source of fluid pressure.

A check valve is provided between the chamber and the source of fluid pressure to permit fluid flow into the chamber, while blocking flow in the reverse direction. The check valve assembly includes a disc having a contoured surface, a valve seat contacting the check valve disc, a spring within the curvature of the disc for biasing the check valve disc in a normally closed position with the contour or curvature facing outward toward the valve seat, and a retaining cap surrounding the spring and check valve assembly. In addition, the check valve has a large inlet orifice, as compared to a ball check valve.

Fluid is supplied by a reservoir and flows through the check valve into the pressurized chamber. To produce a pressure differential, a compression spring is commonly used to provide a bias force on the tensioner piston. This produces a vacuum in the chamber as the piston is urged away from the check valve and permit flow through the valve into the chamber. As the chain slackens and tightens, the piston protrudes and withdraws in response to the vibration of the chain. The outward force of the spring and fluid on the piston balances the inward force of the chain on the piston.

DESCRIPTION OF THE PREFERRED EMBODIMENTS

Figure 1:
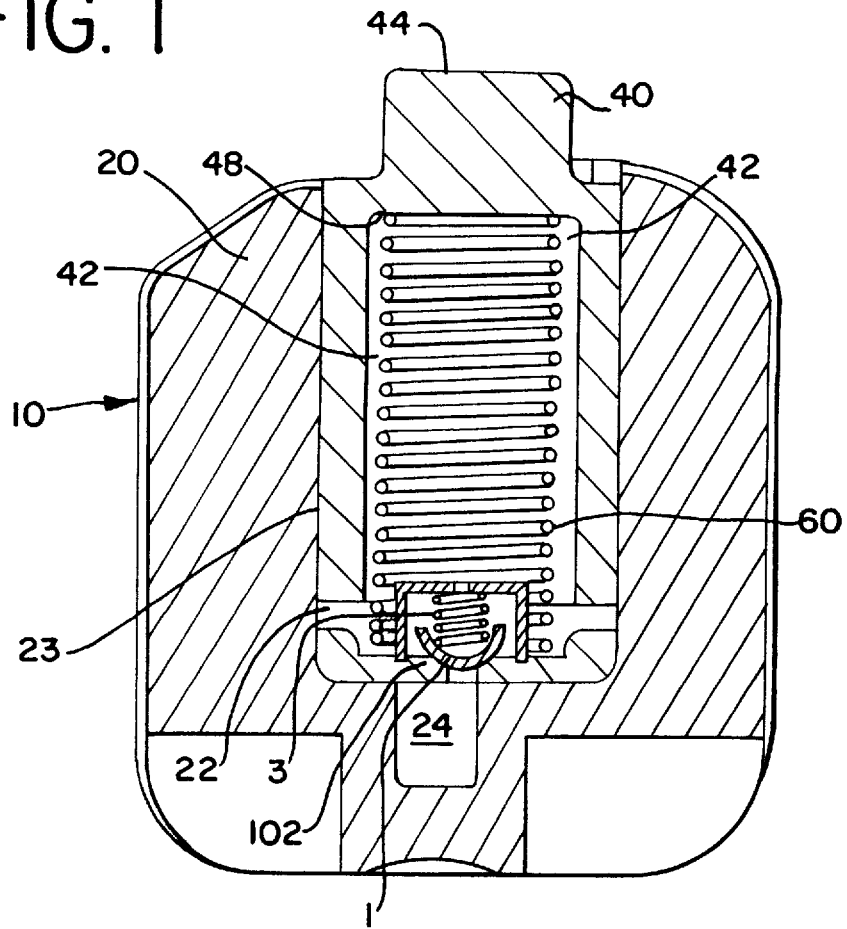
FIG. 1 is a front view of the hydraulic tensioner of the present invention.

FIG. 1 illustrates the hydraulic tensioner 10 incorporating the check valve 100 of the present invention. The tensioner includes a housing 20 having a bore 23 in its center, which is filled with fluid through a passageway 24 from a pressurized fluid source (not shown). The fluid source may be an oil pump or a reservoir. The housing receives a piston or plunger 40 in the bore 23. The hollow plunger 40 forms a fluid chamber 22 with the bore 23. The plunger 40 has an interior space 42 and an upper end 44. The upper end 44 contacts a lever or arm (not shown) to provide tension along a chain strand. A spring 60 contacts the inside 48 of the upper end of the plunger 44 to bias the plunger 40 in a protruding or outward direction from the bore 23.

Figure 2:
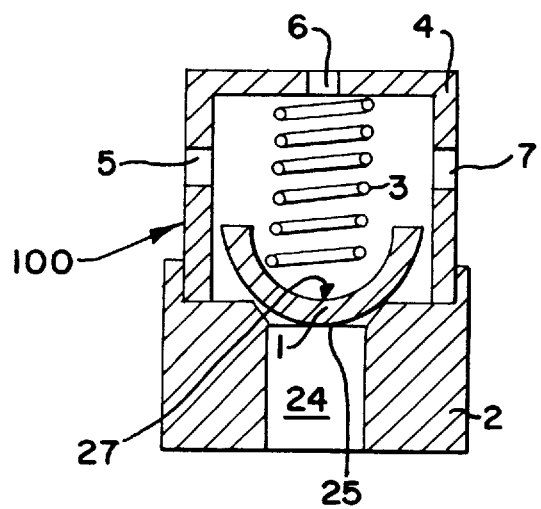
FIG. 2 is an enlarged view of the disc type check valve of the tensioner of FIG. 1 and its associated components.

A check valve 100 is provided between the chamber and the passageway 24 to the source of fluid pressure to permit fluid flow into the chamber 22, while blocking back flow in the reverse direction. The check valve 100 in FIG. 2 includes a disc 1 having a contoured top surface. The disc 1 is contoured at its top, but not at the top of valve 100. The disc is preferably semicircular in shape with the convex portion 25 of the curve facing outward towards the valve seat 2. The bottom surface 25 of the disc contacts or closes the valve against a tapered valve seat 2. The concave upper surface 27 of the disc is in contact with the check valve spring 3 to bias the disc in a closed direction.

A retaining cap 4 surrounds the spring 3 and check valve assembly. The cap 4 includes apertures 5, 6, and 7 for the flow of fluid into and out of the chamber. The spring 3 is biased between the inside of the cap 4 and the disc 1. The shape of the disc enables the disc 1 to respond quickly to the different flowrates.

During start-up of the hydraulic chain tensioner 10 at normal operating conditions, a low pressure condition is created in the chamber 22 which causes fluid to enter through check valve 100 and passageway 24 and fills up the chamber 22. The pressure differential across the check valve 100 opens the valve and allows positive fluid flow into the chamber 22. As the chamber 22 fills with fluid, the plunger 40 moves outward from the chamber 22 due to the force of the spring 60 and the pressure of the fluid supplied by the external source. As the chamber 22 fills, the check valve 100 prevents back flow out of the chamber 22. During operation, the force of the chain against the plunger 40 is balanced by the force of the spring 60 and the pressurized fluid in the chamber 22. The disc 1 will quickly respond to pressure differentials to open and close the check valve 100.

When the hydraulic chain tensioner 10 is started in a low temperature environment, the fluid will be highly viscous and will flow very slowly from the reservoir into the chamber 22. Therefore, high flow is required through the check valve 100. A typical ball check valve has a limited orifice size, so it cannot provide a sufficiently high flow rate to prevent cavitation. The disc type check valve 100 has a low mass and high flow due to a large inlet orifice, in contrast to a ball check valve. The check valve 100 will respond quickly and provide sufficient flow to minimize the effect of cavitation.

In addition, the contour of check valve 100 minimizes the effect of stiction during start-up. In a disc type check valve without a contoured disc, an oil film adheres to the flat disc and the flat check valve seat and prevents the check valve from opening or slows its response to fluid pressure. In the present invention, there is line contact between the disc 1 and the valve seat 2 that creates high contact pressure upon closing, so the valve seat area is kept free of debris and sludge. Therefore, an oil film will not accumulate on the disc 1 and valve seat 2, and stiction will not be a problem in the present invention.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a bore, said bore defining a fluid chamber;

a hollow plunger slidably received within the bore;

a first spring biasing the plunger in a protruding direction from said bore;

a passage in the housing to connect the chamber with a source of pressurized oil; and a check valve provided in the passage between the chamber and the source of pressurized oil to permit fluid flow into the chamber while blocking flow in the reverse direction, said valve including a seat and a translatable valve member, said valve member being of rigid construction and formed of a contoured disc, said contoured disc being semi-circular in shape.

2. The hydraulic tensioner of claim 1 wherein said check valve further comprises a second spring in contact with the check valve disc; a retaining cap surrounding the spring and check valve assembly.

3. The hydraulic tensioner of claim 2 wherein said retaining cap has a plurality of apertures to permit fluid flow through said valve.

4. The hydraulic tensioner of claim 1 wherein a convex portion of said semi-circular disc is biased against said check valve seat.

5. The hydraulic tensioner of claim 4 wherein said check valve includes a spring biased between a check valve cap and said disc, said spring biasing said disc against said seat.

6. The hydraulic tensioner of claim 5 wherein said cap includes a plurality of apertures to permit fluid flow through said check valve.

7. The hydraulic tensioner of claim 1 wherein said contoured disc provides a line contact with said check valve seat.

8. A hydraulic tensioner comprising:

a housing having a bore, said bore defining a fluid chamber;

a hollow plunger slidably received within the bore;

a first spring biasing the plunger in a protruding direction from said bore;

a passage in the housing to connect the chamber with a source of pressurized oil;

a check valve provided in the passage between the chamber and the source of pressurized oil to permit fluid flow into the chamber while blocking flow in the reverse direction, said valve including a seat and a translatable valve member, said valve member being of rigid construction and formed of a contoured disc, said contoured disc being semi-circular in shape; and a second spring biasing the check valve disc in an inward direction, a retaining cap surrounding the second spring and disc, said second spring being biased against said retaining cap, said retaining cap having several apertures to permit fluid flow into the chamber.

* * * * *